3,153,009
CONDENSATION PROCESS FOR POLYVINYL ACETALS
Louis Herman Rombach, Pembrey, Wilmington, Del., assignor to E. I. du Pont de Nemours and Company, Wilmington, Del., a corporation of Delaware
No Drawing. Filed Feb. 24, 1961, Ser. No. 91,309
5 Claims. (Cl. 260—73)

This invention relates to a novel technique for the production of polyvinyl acetals, and, more particularly, to the addition of a surface active agent to render the process more economical and to improve the clarity of the resultant product.

The prior art recognizes some advantages obtained when a surface active agent is added to the reactants in the production of polyvinyl acetals. In U.S. Patent 2,345,946, issued on April 4, 1944, to S. C. Overbaugh, it is shown that from 0.2–1.0% by weight, based on the polyvinyl alcohol, of a dispersing agent will reduce agglomeration of the resin particles when the agent is added to an aqueous solution prior to the introduction of reactants. Overbaugh also indicates that amounts of 3% or more of a surface active agent based on the polyvinyl alcohol, when added to an aqueous solution prior to the introduction of the reactants, will accelerate the reaction as well as control the particle size of the polymer. Among the more effective agents is "Duponol" ME which is predominantly sodium lauryl sulfate with lesser portions of the sodium sulfates of myristyl, cetyl, stearyl, and decyl alcohols. In the case of non-aqueous systems, the effect of the dispersing agent is essentially nil. Additional research has indicated that surface active agents, when incorporated by procedures of the prior art, can produce a haze in the resin which adversely affects its optical properties. Thus, a need has arisen for a technique for the use of such an agent without realizing a decrease in desirable properties of the polymer.

Accordingly, it is an object of the present invention to provide a novel technique for the addition of a surface active agent in the production of polyvinyl acetals which permits full utilization of its beneficial effects and at the same time eliminates the formation of objectionable haze in films made from the resultant polymer so treated. Another object of the present invention is to reduce the excess aldehyde required for a satisfactory degree of condensation. Other objects will become apparent hereinafter.

The above objects are accomplished by providing a process for the preparation of polyvinyl acetals in an aqueous medium which comprises contacting, under agitation, an aqueous solution of polyvinyl alcohol containing an acid catalyst with the aldehyde corresponding to the desired acetal at a temperature of from 50–100°C., and immediately after substantially all the reactants have been added, adding 0.04–0.1% by weight, based upon the weight of the polyvinyl alcohol, of a surface active agent, and thereafter continuing the agitation until the rate of reaction of the aldehyde with the alcohol is substantially reduced. The resultant polymer slurry is then neutralized to retard further reaction and the polymer is recovered and purified by conventional techniques.

The point at which the surface active agent is introduced into the medium containing the reactants is of major importance in the condensation and is one of the novel features of the present invention. If the surface active agent is added to the reaction medium prior to the introduction of reactants, the resin thus produced will exhibit haze and is unacceptable in applications, e.g., as a safety glass interlayer, which require excellent optical clarity, whereas, the addition of surface active agent after the reaction is complete negates the beneficial effect of reducing the amount of aldehyde required in the condensation and results in a less economical process. Numerous surface active agents are operable in the process of the present invention, especially the anionic type, including the preferred agent, sodium lauryl sulfate, as well as ammonium lauryl sulfate; octyl sodium sulfosuccinate; ammonium perfluorocarboxylates having from six to twelve carbon atoms; sodium aryl sulfonates; adducts of chlorinated cyclopentadiene and maleic anhydride; partially neutralized polymethacrylic acid; alkylaryl sulfonates; sodium N-oleyl-N-methyl taurate; sodium alkylaryl polyether sulfonate; triethanolamine lauryl sulfate; diethylcyclohexyl ammonium lauryl sulfate; sodium secondary-alkyl sulfate; sulfated fatty acid esters; sulfated aryl alcohols; and the like. The above surface active agents may be employed at a concentration of from about 0.04–0.2% by weight based upon the polyvinyl alcohol present and it is preferred to employ the agent at a concentration of 0.04–0.1% by weight on the same basis as above. Higher concentrations of surface active agents will affect other properties of the resin. The surface active agent may be introduced into the medium at any point after at least 60% of the polyvinyl alcohol, and at least 50% of the respective aldehyde has been added to the reaction medium with the amount of surface active agent required for optimum results generally increasing as the time of addition increases beyond the aforementioned period, but should be added before the reaction mixture is heated under agitation for extended periods so that the time required for satisfactory completion of the reaction is not increased.

More particularly, the present process involves feeding concurrently into an agitated reaction vessel which contains a small amount of a water heel, (1) an aqueous solution of polyvinyl alcohol containing from 5–12% by weight of the alcohol and preferably 7.0–10.5%, said alcohol having a viscosity of 20–40 centipoises as measured on a 4% aqueous solution at 20° C., and containing an acid catalyst and (2) n-butyraldehyde containing at least 70% by weight of the aldehyde and preferably at least 95% by weight of the aldehyde. The acid catalyst may be a variety of materials including sulfuric acid or para-toluene sulfonic acid, and preferably, mixtures of the aforementioned acids in the weight ratio of sulfuric acid to the sulfonic acid of 50/50 to 30/70. Minor amounts of a sequestering agent are also added with the alcohol solution to prevent color formation in the final product by complexing with any metallic ions and like colors inducers. The preferred sequestering agent is the tetrasodium salt of ethylenediamine tetraacetic acid and it may be employed in the range of 0.05–0.5% by weight based upon the polyvinyl alcohol, and preferably, 0.20–0.25% by weight on the same basis. The pH of the resultant solution should lie between 1.8 and 2.2 and preferably between 1.8 and 1.9. Adjustment may be made to bring the pH within these limits. The temperature of the medium is maintained at 70–99° C. and preferably at 88–92 C. during and after the charge is completed and one of the above-mentioned surface active agents is introduced in the amounts indicated. A minor amount of the butyraldehyde (less than 40% of the total) may be withheld during the concurrent additions and may be introduced before or after the addition of the surface active agent, but preferably, before the surface active agent is introduced. After all additives are in the reaction medium, the temperature of the medium, being within the above-mentioned range, is held relatively constant for 20–200 minutes, and preferably, from 40–100 minutes after which the mixture is substantially neutralized and the polymer is recovered and purified by suitable methods, such as washing with water, etc.

The best balanced properties, e.g., impact resistance at various temperatures, tensile strength and elongation for safety glass interlayers are present when the hydroxyl content of the resin, by the aqueous process herein, lies between about 21.5–23.5, although resins having other hydroxyl contents may be used in other applications. Hydroxyl number as used in this discussion is defined as the weight percent unreacted polyvinyl alcohol in the product, but actually reflects the average number of free hydroxyl groups remaining on each polyvinyl alcohol chain. The hydroxyl content of a resin may be determined by the well known method of acetylation with acetic anhydride and titration of the resultant acetic acid to determine the number of hydroxyl groups which have reacted with the anhydride.

The present condensation is an equilibrium reaction so that excess aldehyde must be added to obtain a resin having a desired hydroxyl content. Generally about 6% excess aldehyde (based upon the stoichiometric amount) is required to obtain a satisfactory product in the absence of any additional materials. It is generally desired to incorporate about two times the hydroxyl content in parts of plasticizer per 100 parts of resin; thus, the hydroxyl content will control the amount of plasticizer employed. Useful plasticizers include triethylene glycol-di-2-ethyl butyrate, dibutyl "Cellosolve" adipate, dibutyl sebacate, and the like.

The adverse effects encountered when a surface active agent is added in a manner other than that set forth herein are readily detectable by visual observation by notation of the amount of developed blue haze in a given laminate. The specimens for determination of the developed blue haze are prepared by the following technique. Approximately 100 parts of the given acetal, the desired amount of plasticizer (determined as set forth hereinabove) and 15.0 parts of ethyl alcohol are mixed in a suitable container heated to about 80° C. until a homogenous mass is obtained. An additional 15.0 parts of ethyl alcohol are then slowly added until a uniform mass is again obtained. The mixture is then extruded through a simple ram machine, having a steam-jacketed die with jaws having an opening of 2 inches by 0.075 inch, at a pressure of about 80 p.s.i. to obtain a strip of film 10 inches long, 1 inch in width, and 0.025 inch thick. The film is supported on a suitable frame and dried at about 65° C. to remove any residual alcohol before it is laminated between two layers of glass. The lamination is accomplished, according to standard procedures, by placing a section of the above strip between two clear glass plates 1 inch x 6 inches x ⅛ inch, placing the laminate in an oven at a temperature of 90° C. for about 15 minutes and pressing the laminate between rubber coated nip rolls. The laminate is then returned to the oven for 45 minutes and again passed thru the nip-rolls. Thereafter, the laminates are placed in an oil-containing autoclave, the pressure in the autoclave is increased to 225 p.s.i. and temperature is increased to 150° C. After the laminates are held under the above conditions for 90 mins. they are removed, cleaned, and inspected for developed blue haze by passing a beam of light, e.g., a beam obtained from a common slide projector, through the laminate with the major surface thereof at an angle of 45° to the beam and observing the transmitted light in the same plane as the beam and at a 90° angle thereto. The blue haze in the sample is compared to a set of standards which vary in about equal increments of haze level from no haze at a haze number of 0 to a smoky grey haze at a haze number of 6. Samples having a developed blue haze number greater than 1 are not satisfactory for safety glass applications. For optimum laminates the haze number should be less than about 0.5.

The following examples are set forth to illustrate and not to restrict the present invention. Parts and percentages are by weight unless otherwise specified.

*Example I*

The following streams having the indicated compositions were introduced concurrently into an agitated vessel containing 100 parts of water at 90° C. over a period of 76 minutes while maintaining the materials at about 90° C.

Stream 1:
    100 parts of polyvinyl alcohol
    900 parts of water
    8 parts acid (70% p-toluene sulfonic, 30% sulfuric)
    0.22 part of a sequestering agent (sodium salt of ethylenediamine tetraacetic acid)

Stream 2: 57.2 parts of butyraldehyde

After the introduction of the above streams was completed, 2.3 parts of butyraldehyde were added and the mixture was heated at 90° C. under agitation for 81 minutes whereupon a 20% solution of sodium hydroxide was introduced until the pH of the mixture, initially at 1.9, was increased to 5.0±0.5. The neutralized material was boiled at atmospheric pressure for 10 minutes before it was cooled to 40° C. and washed with water three times by decantation. The solids were recovered by filtration, reslurried in water and dilute caustic (1 N) to raise the pH of the slurry to about 10 and heated to 90° C. for 30 minutes. This slurry was then washed twice with water by decantation, dried and pressed into a film having a developed blue haze of 0. The hydroxyl content of the polymer was 22.2% but 6.2% excess butyraldehyde was required to obtain the desired hydroxyl content.

*Example II*

The following streams having the indicated compositions were introduced into an agitated vessel containing 100 parts of water at 90° C. over a period of 77.5 minutes while maintaining the material at about 90° C.

Stream 1:
    100 parts of polyvinyl alcohol
    900 parts of water
    8 parts of acid (same composition as Example I)
    0.22 part of the sequestering agent of Example I
    0.05 part of sodium lauryl sulfate Stream 2: 52.1 parts of butyraldehyde After the introduction of the above streams was completed, 5.5 parts of butyraldehyde were added and the mixture was heated under agitation for 94 minutes. The pH of the mixture was 1.80. After the aforementioned heating period, the polymer was worked up as in Example I, and a product having a hydroxyl content of 21.8% was obtained. Although the excess butyraldehyde was considerably reduced (2.1% required excess), the laminate exhibited a developed blue haze of 4.0.

*Example III*

The following streams were introduced concurrently into an agitated vessel containing 100 parts of water at 90° C. over a period of 75 minutes.

Stream 1:
    100 parts of polyvinyl alcohol
    900 parts of water
    8 parts of acid (same composition as Example I)
    0.22 part of the sequestering agent of Example I Stream 2: 50.7 parts of butyraldehyde After the introduction of the above streams was completed, 6.9 parts of butyraldehyde were added to the mixture over a period of 9 minutes followed by the addition of 0.05 part of sodium lauryl sulfate dissolved in 0.5 part of water over a period of 30 seconds. This material was heated at 90° C. under agitation for an additional 95 minutes whereupon the polymer was worked up as in Example I. The hydroxyl content of the polymer was 22.1% while the excess butyraldehyde was substantially reduced (2.7% required excess), and the developed blue haze was excellent (0). Subsequent experiments, according to the procedure of this example, revealed that from 0.04–0.1% by weight, based upon the alcohol present, of a surface active agent produced comparable results with the excess butyraldehyde requirements being substantially reduced.

*Example IV*

The following streams having the indicated compositions were mixed and heated as described in Example III.

Stream 1:
  100 parts of polyvinyl alcohol
  900 parts of water
  8 parts of the acid having the same composition as that in Example I.
  0.22 part of the sequestering agent of Example I
Stream 2: 47.7 parts of butyraldehyde After the above streams were introduced, an additional 7.7 parts of butyraldehyde were added over a period of 10 minutes followed by the addition of 0.5 part of sodium lauryl sulfate dissolved in 5.0 parts of water over a period of 1 minute. This mixture was heated at 90° C. under agitation for an additional 95 minutes, and worked up as in Example I whereupon a product having a hydroxyl content of 22.8% was obtained. The excess butyraldehyde was esesntially zero and the developed blue haze of a laminate prepared from this polymer was excellent (0).

The process of the present invention greatly improves the clarity of films made by an aqueous process while reducing the amounts of reactants required for a film having acceptable physical properties and which may be utilized as an interlayer in the manufacture of safety glass. Any monofunctional aldehyde, e.g., formaldehyde, acetaldehyde, butyraldehyde, heptaldehyde and other aldehydes having the requisite solubility, are considered within the purview of this invention. Bifunctional aldehydes which are operable should also be apparent to those skilled in the art.

I claim:

1. An aqueous process for the preparation of polyvinyl acetals having high optical clarity which comprises contacting concurrently with agitation an aqueous solution of polyvinyl alcohol containing an acid catalyst and the aldehyde which produces the desired acetal, at a temperature of from 50 to 100° C. and after at least 60% of said alcohol and at least 50% by weight of the alcohol of said aldehyde has been contacted, adding 0.04 to 0.2% by weight of the polyvinyl alcohol of a surface active agent; continuing said agitation until the rate of reaction of said aldehyde with said alcohol is substantially reduced and thereafter completely neutralizing said acid, washing the resultant polyvinyl acetal with water and recovering said polyvinyl acetal.

2. An aqueous process for the preparation of polyvinyl acetals having high optical clarity which comprises contacting concurrently under agitation 100 parts by weight of polyvinyl alcohol as an aqueous solution containing 5 to 12% by weight of alcohol and containing an acid catalyst with 54.7 to 86.0 parts of an aldehyde which produces the desired acetal, said aldehyde being at least 70% pure, at a temperature of 50 to 100° C. and at a pH of 1.8 to 2.2, and after at least 60% of said alcohol and at least 50% by weight of the alcohol of said aldehyde has been contacted, adding 0.04 to 0.1 part of an anionic surface active agent; continuing said agitation until the reaction of said aldehyde with said alcohol is substantially reduced and thereafter washing the resulting polyvinyl acetal with water and recovering said polyvinyl acetal.

3. The process of claim 2 wherein the aldehyde corresponding to said acetal is butyraldehyde.

4. The process of claim 3 wherein said anionic surface active agent is predominantly sodium lauryl sulfate.

5. An aqueous process for the preparation of polyvinyl butyral having high optical clarity which comprises contacting concurrently under agitation an aqueous solution containing 7 to 10.5% of polyvinyl alcohol and containing a catalyst being a member selected from the class consisting of sulfuric acid, para-toluene sulfonic acid, and mixtures thereof with butyraldehyde; maintaining the temperature of said mixture at 85 to 98° C. and at a pH of 1.8 to 2.2 and after at least 60% of said alcohol and at least 50% by weight of the alcohol of said aldehyde has been contacted; adding 0.04 to 0.1 part by weight based upon said alcohol of sodium lauryl sulfate; continuing said agitation until the reaction of said aldehyde with said alcohol is substantially complete and recovering said acetal.

References Cited in the file of this patent
UNITED STATES PATENTS

| | | |
|---|---|---|
| 2,345,946 | Overbaugh | Apr. 4, 1944 |
| 2,422,754 | Stamatoff | June 24, 1947 |